United States Patent [19]

Julich et al.

[11] Patent Number: 4,634,110

[45] Date of Patent: Jan. 6, 1987

[54] FAULT DETECTION AND REDUNDANCY MANAGEMENT SYSTEM

[75] Inventors: Paul M. Julich, Indialantic; Jeffrey B. Pearce, Melbourne, both of Fla.

[73] Assignee: Harris Corporation, Melbourne, Fla.

[21] Appl. No.: 518,291

[22] Filed: Jul. 28, 1983

[51] Int. Cl.[4] .................. G06F 15/16; G06F 11/00
[52] U.S. Cl. .................................. 371/11; 364/131; 364/186; 364/187; 371/9
[58] Field of Search ............... 371/9, 11; 364/132, 364/133, 134, 184, 186, 187

[56] References Cited

U.S. PATENT DOCUMENTS

| | | | |
|---|---|---|---|
| 3,636,331 | 1/1972 | Amrehn | 364/133 X |
| 3,875,390 | 4/1975 | Eccles et al. | 364/187 X |
| 4,032,757 | 6/1977 | Eccles | 371/9 X |
| 4,212,057 | 7/1980 | Devlin et al. | 364/134 X |
| 4,215,395 | 7/1980 | Bunyard et al. | 364/134 |
| 4,351,023 | 9/1982 | Richer | 364/187 |
| 4,358,823 | 11/1982 | McDonald et al. | 371/9 X |
| 4,377,000 | 3/1983 | Staab | 371/11 |

OTHER PUBLICATIONS

R. S. Laughlin, The Galaxy/5: A Large Computer Composed of Multiple Microcomputers, 13th IEEE Computer Society Int. Conf., Sep. 7-10, 1976, pp. 90-94.

*Primary Examiner*—Charles E. Atkinson
*Attorney, Agent, or Firm*—Antonelli, Terry & Wands

[57] ABSTRACT

A fault detection and redundancy management system for a dual redundancy based network architecture in which the principal control components (master units) are configured and programmed to repetitively carry out intra- and inter-unit performance tests as an a priori requirement for network command capability. These performance tests are carried out in a prescribed sequence to define the fault detection and reconfiguration procedure. The procedure is designed to preclude the cascading of faults. As a first step in this procedure, each processor in a master unit performs a thorough self-test of its own functional capability. Secondly, if a processor has determined that it has passed all of these internal procedures, it must then successfully inform a designated "chief" processor via an interprocessor handshake. This interprocessor handshake is effected by causing each processor in the master unit to set a flag in a shared memory during a prescribed time interval. These flags are read by the chief processor to determine whether to enable an associated bus controller for the next succeeding time interval, and once these flags have been read they are reset by the chief processor, as each processor is required to refresh the handshake flag during successive repetitive time intervals. If the chief processor determines that all units (including itself) are functional, it executes a handshake with a bus interface unit, so as to enable the bus interface unit to conduct I/O operations on the network bus. Failure to complete any portion of this procedure will cause the affected master unit to "off-line" with the result that the redundant master unit will take command of the network bus.

21 Claims, 8 Drawing Figures

FAULT DETECTION AND REDUNDANCY MANAGEMENT SYSTEM

FIELD OF THE INVENTION

The present invention relates in general to redundant multi-processor data handling and signal processing systems and, in particular, to a scheme for carrying out fault diagnostic testing and controlling the functional insertion and removal of the redundant units within such a system in accordance with the results of such fault diagnostic tests.

BACKGROUND OF THE INVENTION

With continuing advances in the power and versatility of data processing networks and with improvements in circuit miniaturization, applications of such networks to a variety of data handling and information processing systems have also expanded. Microprocessor-based control systems continue to replace a number of system control functions that were formerly performed manually or through cumbersome mechanical/hydraulic linkage configurations. One environment where weight and space restrictions make microprocessor-based control particularly attractive is an airborne control system (e.g. spacecraft/aircraft avionics, weapons delivery, sensor-response system). Because of the critical nature of a significant number of control functions involved (inherent in the nature of the system being controlled), redundancy (backup availability) and fault diagnostics constitute an essential ingredient in the utility and operational success of such a network as a substitute for mechanical/hydraulic control. Moreover, redundancy itself is usually both quantitatively and qualitatively structured in an effort to provide the sought-after fail-safe capability of the system.

For example, in a spacecraft environment, which is extremely remote from a ground service/maintenance facility, high (triple or greater) redundancy is commonly employed to ensure continuous system operation. In non-spacecraft airborne vehicles, a hybrid redundancy approach, where a prime electrical flight control network is augmented by a mechanical/hydraulic link, or vice versa, may be employed.

In a multi-processor redundancy system, fault testing and redundancy management have often incorporated a voting scheme for failure detection and/or selection of which redundant system is to be placed on-line. In a high redundancy network, voting among master controllers, for example, is capable of detecting a failure, i.e. a mismatch among the master controllers, and typically follows an odd man-out rule to identify and exclude a faulty controller. The penalty for such an approach is the considerable cost and hardware (added weight and space) which must be borne by the network. In a dual redundancy network, on the other hand, such a voting technique can only detect a failure, but cannot identify which controller is the faulty unit so that reconfiguration of the network cannot occur. As a result, voting cannot be relied upon as a primary fault tolerance mechanism in a dual redundancy network. A second problem with conventional redundancy management systems is the cascading of faults, i.e. a single fault may cause faults in two or more units due to the coupling introduced by the redundancy management equipment.

SUMMARY OF THE INVENTION

In accordance with the present invention the above-mentioned drawbacks of conventional redundancy networks, including their associated fault diagnostics, are overcome by a fault detection and redundancy management system that reduces hardware requirements while providing accurate fault detection and network auto-configuration and preventing the cascading effect of faults as needed. To this end, the present invention employs a dual redundancy based network architecture in which the principal control components (master units) are multiprocessor-configured and programmed to repetitively carry out intra- and inter-unit performance tests as an a priori requirement for network command capability. These performance tests are carried out by independent devices in a prescribed sequence to define the fault detection procedure. As a first step in this procedure, each processor in a master unit performs a thorough self-test of its own functional capability and the capability of the master unit as seen from the processor's vantage point. This may include, but is not limited to, a test of internal memory, ALU and data parity. Secondly, if a processor has determined that it has passed all of these internal procedures and external checks appear acceptable, it must then successfully inform a designated "chief" processor via an interprocessor handshake. This arrangement is fail-safe because any failure to execute the correct procedure will result in a redundancy management action. This interprocessor handshake is effected by causing each processor in the master unit to set a flag in shared memory during a prescribed time interval. These flags are read by the chief processor to determine whether to enable an associated bus controller for the next succeeding time interval, and once these flags have been read they are reset by the chief processor, as each processor is required to refresh the handshake flag during successive repetitive time intervals. If the flags indicate that each processor is capable of successfully performing its intended processing operations, the chief processor then raises respective MASTER REQUEST and CPU RESET INHIBIT flags in preselected locations in memory, to advise the bus controller of the health of the processors of the master unit. The CPU RESET INHIBIT flag is employed to prevent resetting of the processors during initialization.

The chief processor in a master unit also performs a number of additional checks to determine the ability of the master unit to perform as bus master (take command of the network). These tests include two checks to verify synchronization of the bus controller with the chief processor. A clock/interrupt handshake is used to verify that a repetitive interrupt check and a data input interrupt, which is generated by the bus controller during a polling sequence, occur in the proper order. A loss of synchronization test is carried out to ensure that the processing units and their associated bus controller are operating during the same time window. Should the chief processor detect an anomaly in these tests, it stops enabling the bus controller and fails to set the CPU RESET INHIBIT flag to cause the master unit in question to go off-line, perform a CPU reset and attempt to once again gain "MASTER" status.

The bus controller is enabled by a dedicated flag that is placed in memory by the chief processor - the MASTER REQUEST flag (referenced above). In addition, a CPU RESET INHIBIT flag is employed. In normal operation, both flags will be set periodically by the chief processor and read and reset periodically by the bus controller. In the event of a fault both flags would normally fail being set. In this circumstance the bus controller will drop off-line and a reset of all units in the affected master unit will occur. (This constitutes and attempt to correct the fault.) During initialization following a CPU reset, the CPU RESET INHIBIT flag is set by the chief processor without the MASTER REQUEST flag being set. This enables the master unit to initialize fully before further redundancy management action is taken. To maintain, or be eligible for, bus mastership, the chief processor in a master controller must refresh both of these flags at a prescribed repetition rate. Failure to set the MASTER REQUEST flag prevents the impacted bus controller from initiating commands on the network bus. Failure to set the CPU RESET INHIBIT flag causes all processors within the master unit to be reset by the bus controller.

If the chief processor of the master unit currently acting as the bus master fails to set either the MASTER REQUEST flag or the CPU-RESET INHIBIT flag, the bus controller associated with the master unit will cease polling remote devices on the network bus. The bus controller of the redundant (backup) master unit will detect silence on the network bus and, provided that its MASTER REQUEST and CPU RESET INHIBIT flags are set, will then take command of the network bus. This procedure allows command of the bus to be transferred without direct communication (e.g. voting) between master units.

While the above described procedure provides automatic reconfiguration of the network in response to a single failure, because of multiple independent processor configuration of the architecture, it is possible to program the system to tolerate more than a single failure if the network can be permitted to operate in a degraded mode, depending upon the network application and the impact of the failure(s). In this circumstance, the operation-control routine of the chief processor may be established to simply log a failure from another processor that does not critically affect network operation, for the purpose maintenance or operator (pilot) information, and thereafter continue to set the MASTER REQUEST and CPU RESET INHIBIT flags. Because the processor which detects a failure during a self-health test does not carry-out an interprocessor handshake, it is latched out of the system until a CPU RESET occurs. During this time, a preestablished fault recovery procedure stored in local memory is carried out by the faulty processor, and the system continues to operate in the acceptable degraded mode without the faulty processor.

Applications which do not require redundant master units may also provide a fault tolerant operation with degraded performance in response to a fault. For this purpose, each processor is programmed to assume responsibility for setting the MASTER REQUEST and CPU RESET INHIBIT flags. A processor which detects a failure in its own operation will disable its interrupts and execute the above-mentioned preestablished fault recovery procedure while awaiting a CPU RESET. As long as at least one processor is operational, it will set the MASTER REQUEST and CPU RESET INHIBIT flags so that the system will continue to operate, but without the benefit of those tasks assigned to the faulty processor(s). The bus controller may be programmed to periodically output the processor status flags to a remote unit, so as to provide an indication of processor status.

DETAILED DESCRIPTION

Figure 1:
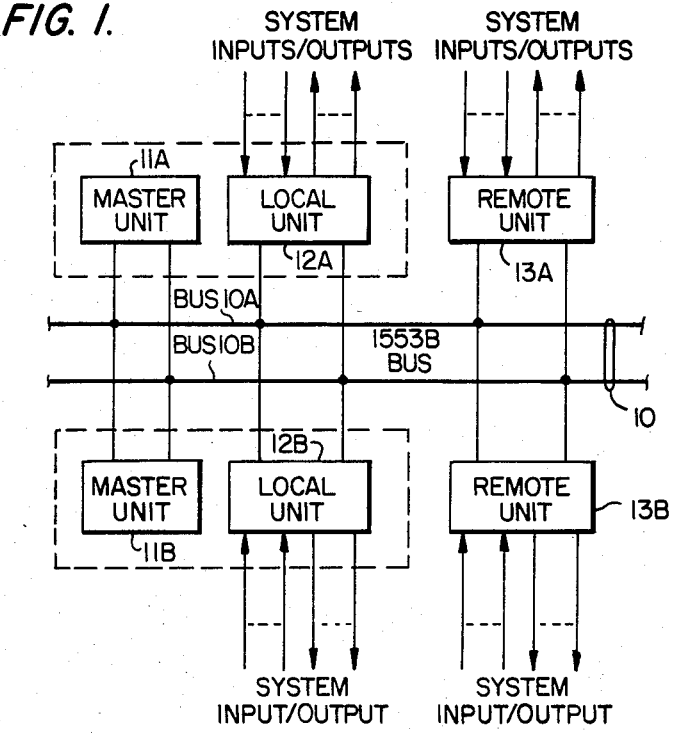
FIG. 1 is a block diagram of a dual redundancy data handling/signal processing network.

Before describing, in detail, the particular improved fault detection and redundancy management system in accordance with the present invention, it should be observed that the present invention resides primarily in a novel structural combination of conventional computer circuits and not in the particular detailed configurations thereof. Accordingly, the structure, control and arrangement of such circuits have been illustrated in the drawings by readily understandable block representations and schematic diagrams, which show only those specific details that are pertinent to the present invention, in order not to obscure the disclosure with structural details which will be readily apparent to those skilled in the art having the benefit of the description herein. In addition, various portions of an electronic data processing system have been appropriately consolidated and simplified in order to emphasize those portions that are most pertinent to the present invention. Thus, the block diagram illustrations of the Figures do not necessarily represent the mechanical structural arrangement of the exemplary system, but are primarily intended to illustrate the major structural components of the system in a convenient functional grouping, whereby the present invention can be more readily understood.

Referring to FIG. 1 there is shown a block diagram of a dual redundancy data handling/signal processing network, the various units of which are distributed along a pair of identical communication buses 10A and 10B which serve as the basic signal transmission link for all the units of the network. As such, each bus 10A and 10B contains a set of address, data and control links through which messages are transferred among the bus users. As noted briefly above, an exemplary environment in which the network architecture of FIG. 1 may be advantageously employed is an airborne (e.g. helicopter) flight control system for performing a number of flight-critical and mission-related tasks such as automated flight control, navigation, and engine/weapons monitoring. It should be observed, however, that such network architecture and the task assignments implemented therein are not limited to this or any other environment and, accordingly, should not be so construed. Instead, both the dual redundancy network and the fault detection and redundancy management system incorporated therein have utility in a number of applications. An airborne control system is described as an exemplary environment because of weight, size limitations, success-dependent nature of the tasks carried out by the network and the critical need to continuously provide system operation, regardless of the occurrence of subsystem anomalies. Given an airborne environment, each bus 10A and 10B may be military standard 1553B buses to which respective sets of master units 11A, 11B, local units 12A and 12B and remote units 13A, 13B are interfaced.

Each of master units 11A, 11B is the basic component through which all data handling/signal processing and operation of the network is effected, and each provides a redundant processing capability (with respect to the other master). The local units 12A, 12B and the remote units 13A, 13B constitute a dual redundant set of interfaces between the master units 11A, 11B and external flight control sensors and actuators (not shown).

Figure 2:
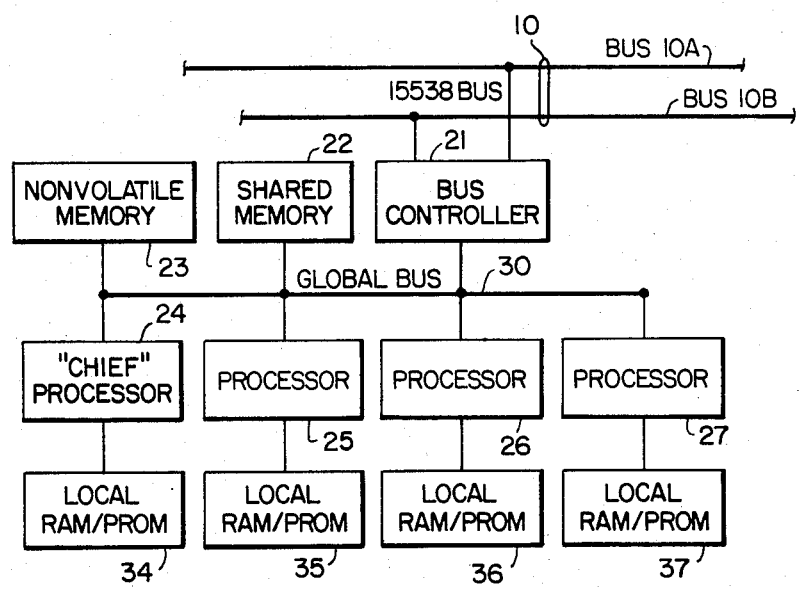
FIG. 2 is a block diagram of the architecture of a master unit employed in the network of FIG. 1.

The internal architecture of a master unit is shown in FIG. 2 as comprising a bus controller or bus interface unit (BIU) 21, through which messages to and from the master unit are interfaced with each of buses 10A and 10B, a set of shared memory units 22 and 23 and a plurality of (four in the example shown) processors 24-27 and associated processor memories 34-37. Communications internal to the master unit are carried out over an internal shared bus 30. In the set of memory units, memory unit 22 is a shared random access memory (RAM) which provides input/output (I/O) buffer storage for data transfers to and from buses 10A and 10B via bus controller 21 and for message transfers among internal processors 24-27. Memory unit 23 is a shared nonvolatile memory for storing critical configuration and control parameter data which cannot be lost in the event of a system failure or shut down. Each of memory units 22 and 23 also serves as a shared data storage area within the master unit having specified addresses to and from which intra-master unit communications take place. Namely, this shared memory set serves as a "bulletin board" for data that may be required by processors 24-27 or bus controller 21 within the master unit. Thus, results of computations by processors 24-27 are placed in shared memory where they can be read by any unit in the master via intra-master bus 30. This bulletin board approach to storing the results of processor actions (flight control computations, sensor output evaluations, etc.) simplifies the housekeeping required for message transfers among processors 24-27 and bus controller 21.

Access to bus 30 is effected in accordance with a preestablished hardware arbitration scheme among the components of the master unit to prevent conflicting memory access requests and collisions on the bus and to prevent any unit on the bus from tying up the bus, as is conventionally employed in multi-processor systems. For this purpose bus 30 is a distributed bus structure, with the arbitration scheme daisy-chained among users of the bus. Any unit which requests and is given access to the bus is permitted only a prescribed communication interval for message transmission, after which it relinquishes the bus to the next requiring unit. This prevents the bus from being monopolized by one unit and thereby prevents cascading of faults. Again, as noted previously, the circuits and bus structure of which the dual redundancy network embodying the present invention are configured employ conventional components and communication protocol and details of the same will not be described except where necessary to provide full appreciation of the invention.

As shown in FIG. 2 one of the processors 24-27, here processor 24, is designated as a "chief" processor which is used to coordinate the fault detection and redundancy management activity between the processors and the bus controller in accordance with the present invention. It is to be noted that any of processors 24-27 may be designated to perform this function, as it is established by software. Moreover, the number of processors and associated memories is not limited to four but may be any number consistent with the required speed of the system and the principles of the invention. The incorporation of processors 24-27 and associated memories 34-37 with a pair of shared memories is based upon the number of flight/mission control functions to be carried out in the selected (e.g. helicopter) airborne environment used in the present example.

As described above each master unit communicates over bus 10 with associated I/O controllers (the local and remote units) via bus controller 21. Bus controller 21 independently handles the communications over bus 10 via the assigned protocol (such as ML/STD 1553B in the present example) for both transmission and reception of messages. During transmission from the master unit, bus controller 21 accesses preassigned buffer storage in either of memories 22 and 23 and assembles the accessed data into the format of bus 10. During reception an incoming message on bus 10 is captured by the bus controller 21 and the information is placed in specified locations in shared memory 22/23. This relieves processors 24-27 of communication bus housekeeping chores, so that they can be maximally used for high speed computations and isolates failures in the processors from failures in the bus controller.

Figure 3:
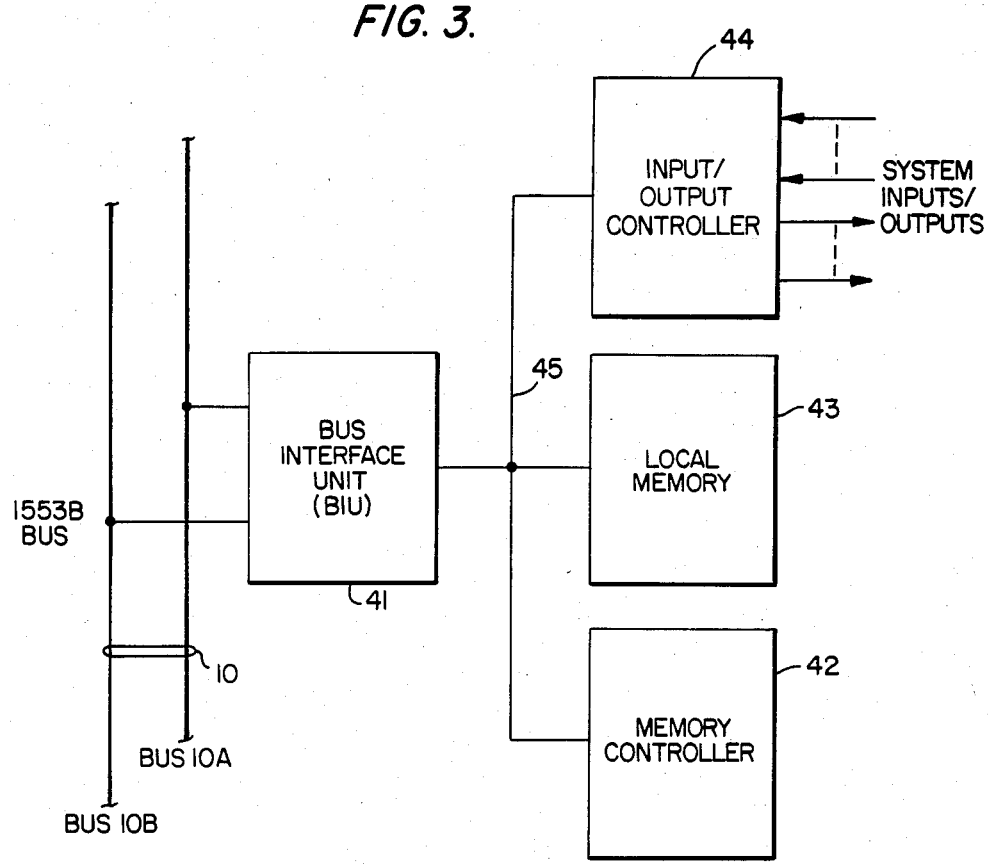
FIG. 3 is a block diagram of the architecture of a remote (local) unit of the network of FIG. 1.

Local units 12A, 12B and remote units 13A, 13B interface data/control transfers between the master units 11A, 11B and sensor/actuator elements of the aircraft and are comprised of a set of I/O, interface and storage elements shown in FIG. 3. As in a master unit each local and remote unit contains a bus interface unit 41 through which messages to and from the bus 10 are coupled to and from buffer storage in local memory 43. Local memory 43 has an associated memory controller 42 and is coupled over bus 45 to I/O controller 44 and bus interface unit 41. I/O controller 44 contains digital-analog and analog-digital converter circuitry, as well as buffer storage units and signal amplifier circuitry, for interfacing signals between the flight action components of the aircraft and the local memory 43. The designations "local" and "remote" are used simply from a standpoint of proximity of these units to the hardware housing the master units in the aircraft. For example, when the master unit rack bay is adjacent to the cockpit part of the helicopter, the forward sensors are serviced by a "local" unit, whereas the tail rotor is serviced by a "remote" unit. Also, the number of such units is not limited to the force shown, but may be any number consistent with the demands of the environment and the specified network bus.

Figure 4:
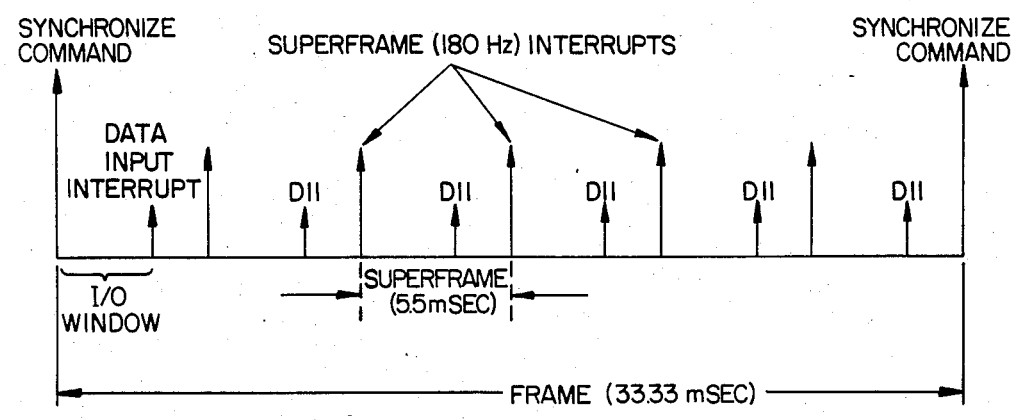
FIG. 4 is a timing diagram of the constituent portions of an individual one of a series of repetitive frames that govern the operation of the network of FIG. 1.

As pointed out above, operation of the redundancy network is controlled by one of the master units 11A, 11B, with the other master, if healthy, being in a standby state and carrying out exactly the same computations in its internal processors so that it is continuously available as a replacement for the command master in the event of a fault. The units of the network are interrupt-driven and synchronized by a repetitive timing signal scheme shown in FIG. 4. Within each master a basic system clock is employed to generate a SYNCHRONIZE COMMAND on bus 10 at the beginning of each of a sequence of prescribed time intervals, termed frames, each of which is comprised of a plurality of shorter intervals, termed superframes, so that a superframe is repeated at some multiple of the repetition rate of a frame. For example in a helicopter environment, a SYNCHRONIZE COMMAND may be issued at a 30 Hz repetition rate, with superframe interrupts (SIs) repeated at a 180 Hz rate. The SYNCHRONIZE COMMAND from each of master units 11A and 11B is conveyed over each of buses 10A and 10B in alternating succession, so that any unit along bus 10 that cannot receive messages on one bus (10A or 10B) will receive the SYNCHRONIZE COMMAND on the other bus (at a 15 Hz rate which is sufficient to maintain adequate synchronization among the units).

Within the master unit proper, synchronization on intra-master bus 30 is controlled by a superframe interrupt (SI) which is generated at the beginning of each superframe (at a 180 Hz rate). This superframe interrupt (SI) is used to identify the beginning of each superframe with six superframes occurring within a frame at the interrupt repetition ratio (180 Hz/30 Hz=6 superframes/frame). It should be observed, however, that the timing scheme employed herein is not limited to these frequencies or ratios but may be tailored according to the needs of the environment and signal processing components employed. Through the use of the superframe interrupts which occur at a multiple of the basic SYNCHRONIZE COMMAND tasks can be easily scheduled to run at multiples of the superframe interrupt rate. For example, sensor data required every other superframe could be processed in the master unit at a 90 Hz rate.

Network Operation

Prior to describing the fault detection and redundancy management scheme incorporated in the network architecture described above, an explanation of the basic network operation will be presented in order that the impact of the invention on such network may be more readily appreciated. In the description to follow the operational sequence will be understood to relate to both redundant systems A and B of the network although only a single system will be described.

In the environment under consideration, flight critical data is continuously and repetitively being made available for processing, is updated, and control signals are generated and refined to carry out aircraft navigation, control surface adjustment, engine control, etc. This data is multiplexed (in time division multiplexed (TDM) message packets) over the network bus 10 among the local and remote units and the master unit. The master unit has stored in memory a primary control (executive) program that dictates the data handling/signal processing sequence to be executed. (The details of the various routines within the executive task program are not required for an understanding of the present invention and, accordingly, will not be described here. It should be noted, however, that critical deterministic processing tasks are guaranteed execution time by virtue of the superframe interrupt timing scheme shown in FIG. 4.)

More particularly, at the beginning of each superframe, a superframe interrupt (SI) causes the master unit's bus controller 21 to access a polling list stored in dedicated memory which identifies I/O operations that must be performed during that particular superframe. In accordance with this list bus controller 21 will write inputs (from interface units (local/remote units) supplied over bus 10) into memory 22/23 via bus 30, or will read out data stored in memory 22/23 and assemble messages containing this data for transmission over bus 10 to the appropriate interface device (local unit 12 or remote unit 13). Upon completion of the input messages for a given superframe bus controller 21 generates a data input interrupt (DII) (which can occur at any point in the polling list) to which the processors in the master unit respond by processing new data that has been written into stored memory during the I/O window between the superframe interrupt (SI) and the data input interrupt (DII). When the items of the current list have been processed in processors 24–27 and the results have been placed in their preassigned locations in memories 22/23, the master unit (being interrupt driven as noted above) waits until the next superframe interrupt, whereupon the above process is repeated, using the polling list for the next superframe. It should be noted here that the various data processing tasks that are required to be carried out for proper operation and control of the environment of interest (e.g. helicopter flight/mission control) are appropriately subdivided among the superframes so that they are guaranteed to run to completion once started. In other words, loading allocations within the task list are effected on a worst-case basis, to permit sufficient time in a superframe for the processors of the master unit to complete execution of their assigned tasks. The length of a frame and the number of superframes per frame, as well as the speed of the processing, will govern the number of tasks that may be performed within the context of operation of the particular control function of interest. In the present example of an airborne flight/mission control network, the 5.5 msec time window per superframe within a frame window of 33.33 msec has been found to be sufficient for performing such tasks and also adequate to allow for additional statistical processing (among the background tasks and which need not be completed in a specific time frame) that are not critical to the successful operation of the environment (aircraft) being controlled.

In addition to ensuring that task allocation among the processing intervals (superframes/frame) is adequate to generate successful system operation when the network is performing properly, there must also be built into the network the capability of effecting replacement of a network component upon the detection of a fault. Since data handling/signal processing functions are performed by the master units, it is imperative that the performance of the master unit be monitored continuously and, when a prescribed fault tolerance is exceeded, that the redundant master unit be substituted immediately. As pointed out above, this is accomplished according to the present invention by a new and improved fault detection and redundancy management scheme pursuant to which the health of the bus master is checked by multiple independent processors through a mechanism of requiring the internal makeup of each master to examine itself and its view of the health of the master unit and report on that check.

As described above, for controlling the operation of a helicopter, data I/O and signal processing tasks are executed as deterministic according to a predetermined executive schedule in the master unit. Since the health of a master unit is, by its very nature, critically deterministic, fault detection is also scheduled to be responsive to superframe interrupts (SIs). In accordance with the invention, the master unit carries out this self-evaluation by requiring each processor in the unit to both perform specified tasks and to report its ability to communicate. This latter function is vitally important since, even when a processor can process data, if it cannot transfer the results of that processing to the required locations in shared memory, the communication mechanism in the master unit, then the processor is effectively useless.

Figure 6:
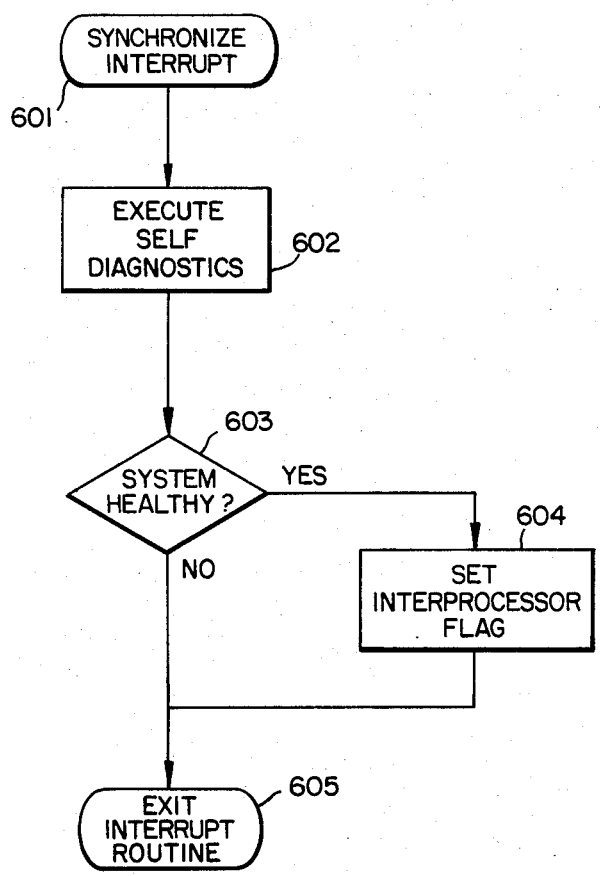
FIG. 6 is a flow chart of the redundancy management/fault diagnostic routine carried out by an individual processor of a master unit.

Referring now to FIG. 6 showing a flow chart of the self diagnostic/handshake procedure of an individual processor, the above procedure is initiated in response to a superframe interrupt (SI) at step 601. In accordance with a preferred embodiment of the invention, step 601 corresponds to an SI every other superframe (here, the odd superframes) in response to which the chief processor takes action (in the even superframes, as will be described below). At step 602, the processor carries out self diagnostics to determine the processor's view of system health. If, as a result of these tests, the system appears healthy (step 602-YES) the processor is required to set an interprocessor handshake flag (step 604) in memory 22. Not only does this flag indicate the health of the processor, but it also equates with the ability of the processor to communicate and may therefore be recognized as an interprocessor handshake. The routine then exits at step 605. If the result of step 603 is NO, the routine exits at step 605 with no interprocessor handshake having taken place for that particular processor.

As noted previously, if the processor detects a failure in its own operation (in the event of data or program dependent errors such as memory parity, illegal instruction, etc., that processor will disable interrupts (its own), attempt to log the error for maintenance purposes, and execute a no-operation loop, so that step 604 is not executed and an interprocessor handshake is not conveyed to memory 22.

Figure 7:
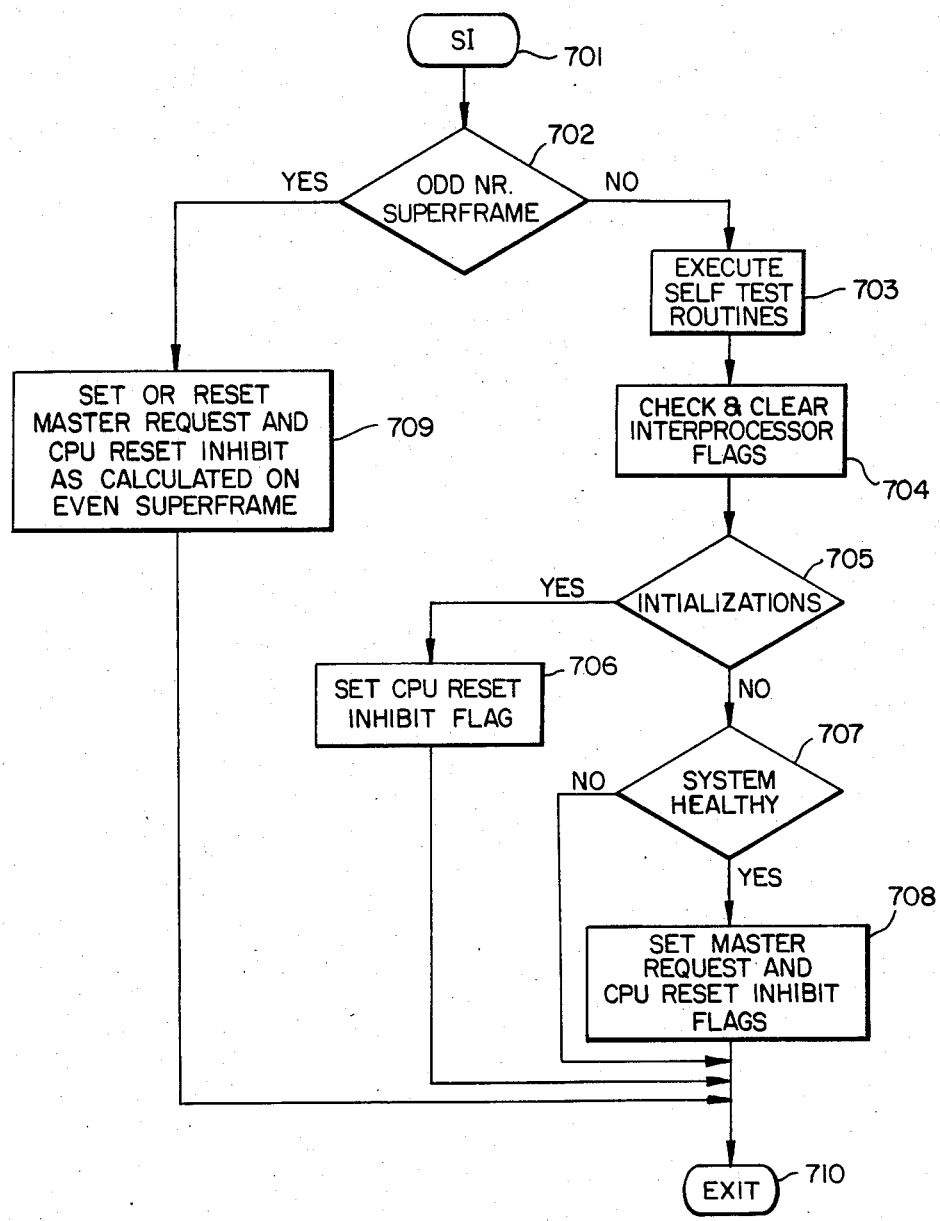
FIG. 7 is a flow chart of the redundancy management/fault diagnostic routine carried out by the chief processor of a master unit.

One of the processors, here processor 24, assigned the task of being the chief processor, has stored in PROM 34 the task of reading memory 22 for the presence of all such flags, including its own. This is shown in FIG. 7 which is a flow chart of the routine carried out by chief processor 24. As illustrated therein, chief processor 24 responds to a superframe interrupt (step 701) and, depending upon the superframe of interest (step 702), will either carrying out diagnostics tests and report on these tests (raising the MASTER REQUEST and CPU RESET INHIBIT flags) if the superframe is an odd superframe, or it will repeat (refresh) the MASTER REQUEST and CPU RESET INHIBIT flags of the previous superframe, if the superframe is even (step 709). After processor 24 has executed its own self diagnostics test (step 703) and examined memory 22 for interprocessor handshakes (step 704), it inquires as to the status of the system, i.e. whether the system is being initialized (step 705). If the system is being initialized, the CPU RESET INHIBIT flag is set in step 706 and the routine exits at step 710. (This flag prevents a lock-up reset loop during system start-up.) If the mode is other than initialization, processor 24 checks system health at step 707. Namely it checks to see if all interprocessor handshakes have been set or, if a degraded level of system performance is tolerable, whether those handshakes critical to this tolerable level of performance have been set. If the system is healthy (completely or tolerable) processor 24 raises the MASTER REQUEST and CPU RESET INHIBIT flags in step 708 and exits at step 710. If the system is not healthy, neither flat is set. As mentioned previously, the repeated raising of the MASTER REQUEST flag every superframe is an a priori requirement for bus command capability by the master unit. Also, the chief processor 24 immediately resets all handshake flags after reading them (step 704), as each processor must periodically refresh its handshake flag every other superframe for the master to be considered healthy.

As noted above, the interprocessor handshake is generated by a processor after the processor having successfully completed a series of self-tests. The specifics of such tests, per se, are not required for an understanding of the present invention and will not be described in detail here. As examples of such tests, however, each processor may examine the performance of its own ALU (arithmetic logic unit) by executing a representative subset of that processor's arithmetic and logical instructions and comparing the results of the execution to specified values stored in the processor's associated PROM. Such tests may include the use of all the processor's registers so as to fully examine the health of the processor.

Another useful test is a memory evaluation (write-read test), which may be performed by writing specified reference data patterns in real time to preestablished locations in each of non-volatile memory 23, shared memory 22 and local memory (34–37) and reading out the contents of those locations to verify the results. Such a test is principally intended to check interfaces between the processors and memory.

In addition to the tests exemplified above, the processors may also carry out parity checks as a check on memory transactions; moreover, further self-diagnostics, such as clock/interrupt generation, task overflow, may be employed to indicate the health of the processor. As noted above, the specific tests, per se, and the details thereof, may be selected from a variety of self-diagnostic functions, employed in current data processors. What is important, however, is that there be provided an indication of the results of tests (and the ability of the processor to communicate) by the setting of the handshake (and health) flag by the processor in shared memory 22. Namely, a dual function is achieved by the flag—an indication of the processor's computation capability (intraprocessor signaling) and its data transfer capability (interprocessor signaling).

As noted above, when the chief processor 24 successfully has read all handshake flags in memory 22, it raises a MASTER REQUEST flag in a specified location in memory 22, which is read by bus controller 21. It may also perform a number of global master unit checks to further determine the ability of the master unit to take command of the bus. Such global checks may include inquiries for verifying synchronization of bus controller 21 with chief processor 24. One such check is to simply observe whether the superframe interrupt (180 Hz repetition rate) precedes the data input interrupt (DII) for each superframe, namely, that SI and DII interrupts occur in the proper order. A second global check (a loss of sync test) may be used determine that the processors 24–27 and bus controller 21 are operating within the same superframe. This is accomplished through the use of software counters for the chief processor 24 and bus controller 21 and comparing in the chief processor the count values of each. Each software counter is reset to zero and counts through five (for the six superframes per frame) before being reset.

Should chief processor 24 detect an anomaly in any of the above required checks, it will cease raising the MASTER REQUEST flag. When bus controller 21 fails to see the MASTER REQUEST flag raised, it ceases polling on bus 10, to allow the current backup master unit, if healthy itself, to take command of the bus 10. In order for the backup master to be considered healthy, its chief processor 24 must have raised (and continue to raise every superframe) the MASTER REQUEST flag and a CPU RESET INHIBIT flag in dedicated locations in memory 22.

If the MASTER REQUEST flag has not been set in memory 22 (i.e. is not refreshed for each superframe, as noted previously) associated bus controller 21 is prevented from communicating over bus 10 to the local and remote units so that the particular master unit is obviously ineligible to take command of bus 10. Similarly, if the CPU RESET INHIBIT flag is not refreshed in memory 22 every superframe, bus controller 21 immediately resets each of processors 24-27 in the master unit. Thus, if chief processor 24 of the current bus master unit fails to refresh either of the above flags each superframe, bus controller 21 will no longer poll the local and remote units 12 and 13 along bus 10.

Transfer of command of bus 10 between master units 11A and 11B is initiated when the bus controller 21 of the backup master senses inactivity over bus 10. Provided that its own MASTER REQUEST and CPU RESET INHIBIT flags are refreshed, bus controller 21 then proceeds to take command of the bus without any direct communication from the other master unit.

Figure 5:
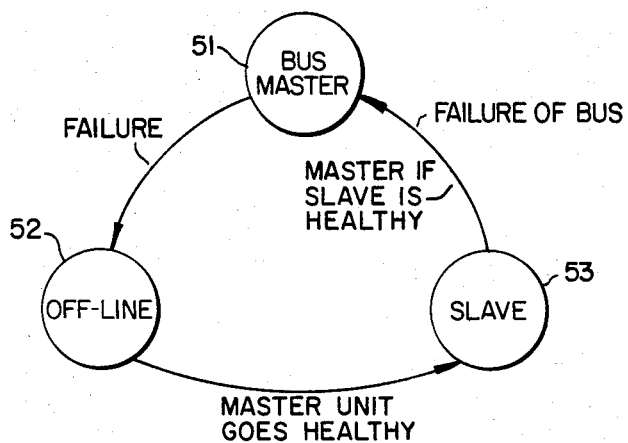
FIG. 5 is a state diagram of a bus master unit as related to command of the network bus.

The above action is illustrated in FIG. 5 which shows a state diagram for a bus master. If a master unit is healthy and in command of the bus its status is that of bus master 51. In the event of a failure and replacement of the other master unit to command the bus, the faulty master unit goes off line 52 and carries out internal procedures to try to regain its master status. Once again healthy, the master unit acts as a "hot back-up" slave 53 for the current bus master. If the current bus master fails, then the "hot back-up" slave master unit assumes command of the bus 51.

Figure 8:
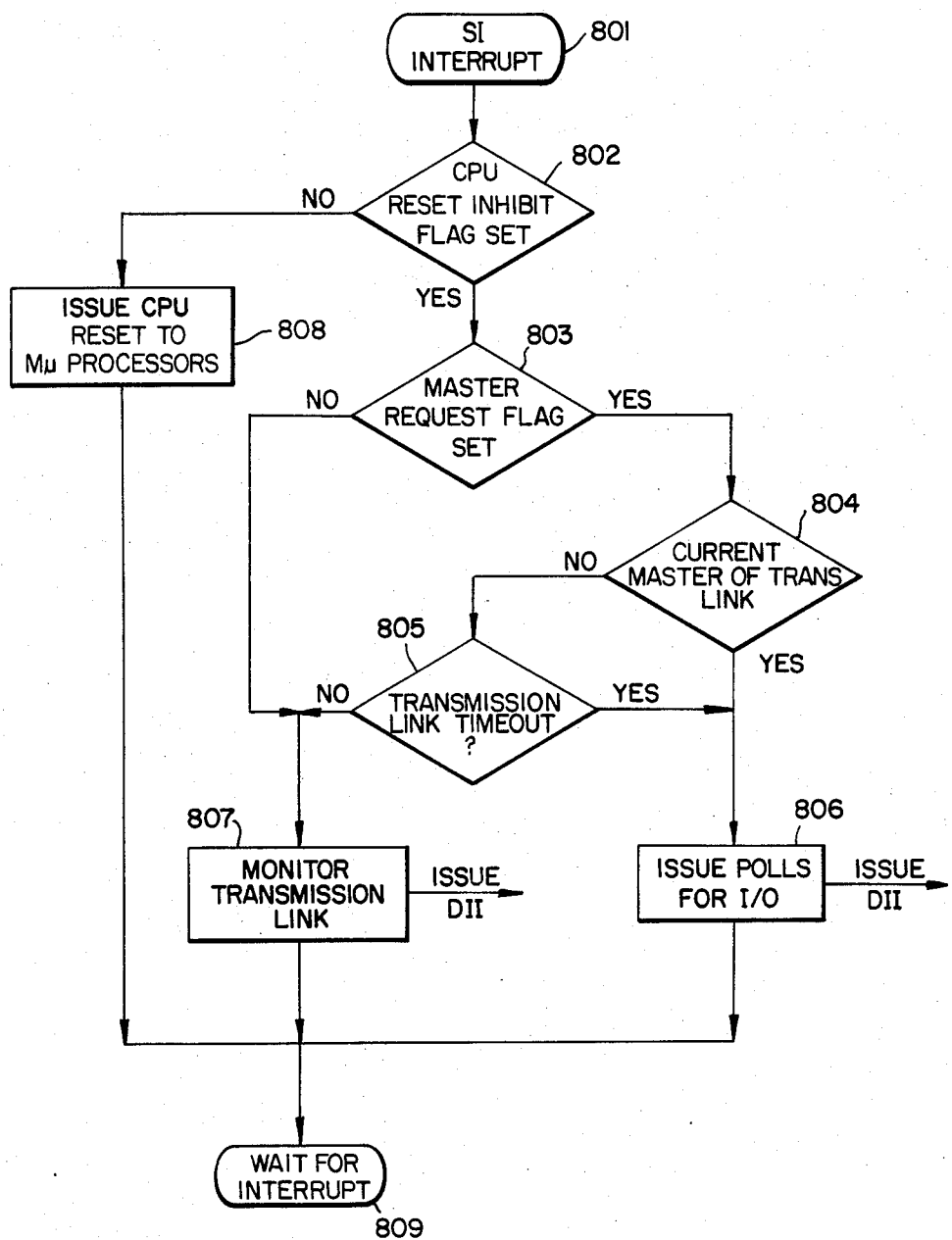
FIG. 8 is a flow chart of the redundancy management/fault diagnostic routine carried out by the bus controller of a master unit.

Referring to FIG. 8 a flow chart of the above routine carried out by the bus controller 21 is shown. Bus controller 21 responds to a superframe interrupt at step 801 and checks the status of the CPU RESET INHIBIT flag at step 802. If the chief processor has failed to raise the CPU RESET INHIBIT flag, bus controller 21 issues a CPU reset to each of the processors in the master unit (step 808) and then waits for the next superframe interrupt (step 809). The bus controller 21 next checks to see if the MASTER REQUEST flag has been raised (step 803). If not, the bus controller monitors transmission link 10 for activity, issues data input interrupts (DIIs) as required (step 807) and waits for the next SI. If the chief processor has raised the MASTER REQUEST flag, bus controller 21 checks to see if it is currently master of the bus (step 804). If its master unit is currently in command of the bus, it polls the various I/O units (step 806), issues DIIs and then waits for the next SI (steps 806, 809).

As pointed out previously, the mechanism for effecting master unit swapover is monitoring silence on bus 10. If a master unit is not currently in command of the bus, it is conducting redundant (backups) data processing operations that will ensure network operational success in the event of a failure of the other master unit. This mechanism is effected by monitoring the bus for inactivity (silence) via a time out inquiry (step 805). If a prescribed time out interval during which no activity on bus 10 is detected is exceeded, the backup master unit immediately assumes command of the bus (bus controller issues I/O polls (step 806)).

In addition to controlling swapover between master units, bus controller 21 also carries out redundancy management between buses 10A and 10B. A series of bus-health tests are conducted during each message transfer and if any test is failed, bus controller 21 will communicate over the opposite bus when the next communication to the local or remote device affected by the failure takes place. These tests include bus parity, proper sync detection, and communication time-outs that require each polled device to respond to bus controller 21 within a prescribed time interval. For this purpose bus controller 21 contains a message time out counter (not shown) which is reset upon each message transmission. A comparator monitors the contents of this counter, that are incremented continuously, with a reference value. If there is no message return within the time interval corresponding to the reference value, a time-out error signal is generated. In response to this error signal bus controller 21 conducts its next poll to the affected device over the other of buses 10A and 10B.

Bus controller 21 may include a counter (not shown) for comparing the number of data words that have been requested in a communication to a local or remote device with the actual number of words that are received in a response message. In response to a discrepancy between the number of words requested and the actual number received, bus controller 21 switches over to the other one of buses 10A and 10B on the next communication.

Bus controller 21 may also carry out a parity check or a signal format check on the information received over bus 10. In response to an error, the data is discarded and bus controller 21 switches over to the other one of buses 10A and 10B on the next transaction. Bus controller 21 will also switch over to the other bus if it detects a garbled transmission from a local or remote device. In other words, bus controller 21 continuously monitors the fidelity of the transmissions on the bus link over which bus controller 21 is communicating to local and remote devices. When an anomaly occurs, bus controller 21 proceeds to carry out its next transmission over the redundant bus during the next succeeding time slot assigned to that local or remote device.

Should a catastrophic failure occur on both buses, namely, the bus master cannot properly communicate to any local or remote unit on either bus, the bus controller 21 will relinquish command of the bus to the backup master unit as shown in the state diagram of FIG. 5.

As will be appreciated from the foregoing description of the present invention drawbacks of conventional redundancy networks, including their associated fault diagnostics, are overcome by a fault detection and redundancy management system that reduces hardware requirements while providing accurate fault detection and network auto-configuration as required. Because the master units are multiprocessor-configured and programmed to repetitively carry out intra- and inter-unit performance tests as an a priori requirement for network command capability the health and communication capability of each master unit can be checked on a continuous basis while avoiding the cascading of faults that may occur.

While we have shown and described an embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. For use in a redundancy-configured control apparatus having a plutality of available multi-processor control units through which control of the operation of said apparatus is carried out, a plurality of input/output units through which signals are interfaced between actuator/sensor units and said control units, and a signal transmission link through which said control units communicate with said input/output units for responding to input signals from and supplying output signals to said actuator/sensor units, an arrangement of controlling the functional coupling of said units to said signal transmission link and thereby the operation of said apparatus by one of said control units comprising, within each respective control unit:

first means, coupled with each of the multiple processors within that respective control unit, for providing an indication of the operational capability of each of said multiple processors;

second means, coupled to said first means, for enabling the functional coupled of said control unit to said link so that said control unit may assume control of said apparatus in response to said first means providing an indication that each of said multiple processors is capable of successfully carrying out its intended processing operations; and wherein said control unit includes a bus interface unit, coupled to said signal transmission link, for assembling and disassembling messages between said signal transmission link and said control unit, and wherein said second means includes means for providing said indication to said bus interface unit that each of said processors is capable of successfully carrying out its intended processing operation.

2. An arrangement according to claim 1, wherein said control unit further includes shared memory to which said multiple processors are coupled, and wherein said bus interface unit is coupled to said shared memory.

3. An arrangement according to claim 2, wherein said first means comprises means, associated with each processor, for storing respective first data in respective preselected locations in said memory representative of the capability of said respective processors to carry out their intended processing operations, and said second means includes means, associated with one of said processors for storing in a predetermined location in said memory second data corresponding to an indication whether each of said processors is capable of successfully carrying out its intended processing operations in accordance with said first data stored in said respective preselected locations in said memory.

4. An arrangement according to claim 3, wherein said second means includes means for modifying said first data in said respective preselected locations in said memory in the course of storing said second data in said predetermined location in said memory.

5. An arrangement according to claim 4, wherein said first means comprises means for periodically storing said respective first data in said respective preselected locations in said memory.

6. An arrangement according to claim 5, wherein said second means comprises means for periodically storing said second data in said predetermined locations in said memory in accordance with said periodically stored first data.

7. An arrangement according to claim 1, wherein said signal transmission link comprises a plurality of redundant communication buses to each of which the units of said control apparatus are coupled and wherein said second means includes means for enabling said control unit to carry out communications in assuming control of said apparatus over one of said redundant communication buses.

8. An arrangement according to claim 1, wherein said second means includes means for preventing said control unit from assuming control of said apparatus unless said first means provides an indication that each of said multiple processors is capable of successfully carrying out its intended processing operations.

9. An arrangement according to claim 3, wherein second means includes means for decoupling said bus interface unit and thereby said control unit from said signal transmission link in response to said first means failing to provide an indication that each of said multiple processors is capable of successfully carrying out its intended processing operations.

10. An arrangement according to claim 9, wherein said second means includes means for initiating action on the part of said bus interface unit to assume control of said signal transmission link in response to the first means of the redundant control unit failing to provide an indication that each of the multiple processors of said redundant control unit is capable of successfully carrying out its intended processing operations.

11. An arrangement according to claim 10, wherein said signal transmission link comprises a plurality of redundant communication buses to each of which the units of said control apparatus are coupled and wherein said second means includes means for enabling said control unit to carry out communications in assuming control of said apparatus over one of said redundant communication buses.

12. For use in a redundancy-configured control apparatus having a plurality of available multi-processor control units through which control of the operation of said apparatus is carried out, a plurality of input/output units through which signals are interfaced between actuator/sensor units and said control units, and a signal transmission link through which said control units communicate with said input/output units for responding to input signals from and supplying output signals to said actautor/sensor units, a method of controlling the functional coupling of said units to said signal transmission link and thereby the operation of said apparatus by one of said control units comprising the steps of:

(a) providing an indication of the operational capability of each of said multiple processors within said control unit; and (b) enabling the functional coupling of said control unit to said signal transmission link so that said control unit may assume control of said apparatus in response to step (a) indicating that each of said multiple processors is capable of successfully carrying out its intended operations; and wherein said control unit includes a bus interface unit coupled to said signal transmission link for assembling and disassembling messages between said link and said control unit, and wherein step (b) comprises providing said indication to said bus interface unit that each of said processors is capable of successfully carrying out its intended processing operations.

13. A method according to claim 12, wherein said control unit further includes shared memory to which said multiple processors are coupled, and wherein said bus interface unit is further coupled to said shared memory.

14. A method according to claim 12, wherein step (a) comprises the steps of causing each of said processors to provide an indication of its capability to successfully carrying out its intended processing operations, and communicating said indication to said memory so as to store therein first prescribed data representative of said capability.

15. A method according to claim 14, wherein step (b) comprises storing in said memory second prescribed data representative of whether each of said processors is capable of successfully carrying out its intended processing operations in response to said first prescribed data stored in step (a), and enabling the functional coupling of said control unit to said signal transmission link in dependence upon said second prescribed data.

16. A method according to claim 14, wherein step (b) comprises causing a selected one of said processors to monitor said first prescribed data and to store in memory second prescribed data representative of whether each of said processors is capable of successfully carrying out its intended processing operations in response to said first prescribed data stored in step (a), and enabling the functional coupling of said control unit to said signal transmission link in dependence upon said second prescribed data.

17. A method according to claim 16, wherein step (b) further comprises causing said selected one of said processors to modify said first prescribed data in the course of storing said second data in said memory.

18. A method according to claim 17, wherein step (a) is carried out periodically and step (b) comprises periodically modifying said first prescribed data and periodically generating said second data in dependence thereon.

19. A method according to claim 13, wherein step (b) comprises the step of decoupling said bus interface unit and thereby said control unit from said signal transmission link in response to step (a) failing to provide an indication that each of said multiple processors is capable of successfully carrying out its intended operations.

20. A method according to claim 19, wherein step (b) further comprises the step of initiating action by the bus interface unit of the redundant control unit to assume control of said signal transmission link in response to step (a) failing to provide an indication that each of said multiple processors is capable of successfully carrying out its intended processing operations.

21. A method according to claim 18, wherein said signal transmission link comprises a plurality of redundant communication buses to which each of the units of said control apparatus are coupled and step (b) includes the step of enabling said control unit to effect communications over one of said redundant communications links.

* * * * *